United States Patent
Chung et al.

(10) Patent No.: US 6,532,045 B2
(45) Date of Patent: Mar. 11, 2003

(54) TRANSFLECTIVE LIQUID CRYSTAL DISPLAY DEVICE AND METHOD OF MANUFACTURING THE SAME

(75) Inventors: Jae-Young Chung, Pusan (KR); Sang-Chol Park, Kyoungsangbuk-do (KR)

(73) Assignee: LG. Philips LCD Co. Ltd., Seoul (KR)

( * ) Notice: Subject to any disclaimer, the term of this patent is extended or adjusted under 35 U.S.C. 154(b) by 90 days.

(21) Appl. No.: 09/741,047

(22) Filed: Dec. 21, 2000

(65) Prior Publication Data

US 2001/0022634 A1 Sep. 20, 2001

(30) Foreign Application Priority Data

Dec. 28, 1999 (KR) .............................. 99-63250

(51) Int. Cl.[7] .............................................. G02F 1/1335
(52) U.S. Cl. ..................... 349/43; 349/114; 349/110; 349/111; 349/113
(58) Field of Search ................. 349/113, 43, 114, 349/110, 111

(56) References Cited

U.S. PATENT DOCUMENTS 6,160,598 A * 12/2000 Lyu ............................ 349/111
6,452,654 B2 * 9/2002 Kubo et al. .................. 349/114

* cited by examiner

Primary Examiner—Robert H. Kim
Assistant Examiner—Thoi V. Duong
(74) Attorney, Agent, or Firm—Birch, Stewart, Kolasch & Birch, LLP

(57) ABSTRACT

An array substrate of the transflective LCD device that includes forming a reflective plate on the substrate at first. An array substrate of transflective LCD device, including: a substrate having switching elements and a pixel region; a reflective plate formed on the substrate and having a light transmitting hole; a first insulating layer formed on the reflective plate while covering the light transmitting hole; a gate electrode formed on the first insulating layer over the reflective plate; a gate insulating layer formed on the first insulating layer while covering the gate electrode; an active layer formed on the gate insulating layer over the gate electrode and having a channel region; an ohmic contact layer formed on the active layer; source and drain electrodes formed on the ohmic contact layer and spaced apart from each other; a second insulating layer formed on the gate insulating layer while covering the source and drain electrode, the second insulating layer having a drain contact hole which exposes the predetermined portion of the drain electrode; and a pixel electrode formed on the second insulating layer and contacting the drain electrode through the drain contact hole.

22 Claims, 6 Drawing Sheets

TRANSFLECTIVE LIQUID CRYSTAL DISPLAY DEVICE AND METHOD OF MANUFACTURING THE SAME

CROSS REFERENCE

This application claims the benefit of Korean Patent Application No. 1999 -63250, filed on Dec. 28, 1999, under 35 U.S.C. §119, the entirety of which is hereby incorporated by reference.

BACKGROUND OF THE INVENTION

1. Field of the invention

The present invention relates to a liquid crystal display (LCD) device, and more particularly, to a transflective LCD device and a method of manufacturing the same.

2. Description of Related Art

Until now, the cathode-ray tube (CRT) has been developed for and is mainly used for the display systems. However, the flat panel display is beginning to make its appearance due to the requirement of the small depth dimensions and the desirability of low weight and low voltage power supply. At this point, the thin film transistor-liquid crystal display (TFT-LCD) having a high resolution and small depth dimension has been developed.

In the operating principles of the TFT-LCD, when the pixel is turned ON by the switching elements, the pixel transmits the light generated from the backlight device. The switching elements are generally an amorphous silicon thin film transistor (a-Si:H TFT) which has the semiconductor layer because the amorphous silicon TFT can be formed on a low cost glass substrate at low temperature.

In general, the TFT-LCD produces the image using the light from the back light device that is positioned under the TFT-LCD panel. However, the TFT-LCD only employs 3~8% of the incident light generated from the backlight device, i.e., inefficient optical modulation.

Referring to the attached drawings, an array substrate of an LCD device that is manufactured by a conventional method will now be explained in some detail.

FIG. 1 is a graph illustrating a transmittance respectively measured after light passes through each layer of a conventional liquid crystal display device.

The two polarizers have a transmittance of 45% and, the two substrates have a transmittance of 94%. The TFT array and the pixel electrode have a transmittance of 65%, and the color filter has a transmittance of 27%. Therefore, the typical transmissive LCD device has a transmittance of about 7.4% as seen in FIG. 1, which shows a transmittance (in brightness %) after light passes through each layer of the device. For this reason, the transmissive LCD device requires a high initial brightness, and thus electric power consumption by the backlight device increases. A relatively heavy battery is needed to supply sufficient power to the backlight of such a device. Moreover, there still exists a problem that the battery can not be used for a long time.

In order to overcome the problem described above, the reflective LCD has been developed. Since the reflective LCD device uses ambient light, it is light and easy to carry. Also, the reflective LCD device is superior in aperture ratio compared to the transmissive LCD device.

FIG. 2 is a plan view illustrating a typical reflective LCD device. As shown in FIG. 2, the reflective LCD device 100 includes gate lines 6 and 8 arranged in a transverse direction, data lines 2 and 4 arranged in a longitudinal direction perpendicular to the gate lines 6 and 8, and thin film transistors (TFTs), for example, the thin film transistor "S" near a cross point of the gate line 8 and the data line 2. Each of the TFTs "S" has a gate electrode 18, a source electrode 12 and a drain electrode 14. The source electrode 12 extends from the data line 2, and the gate electrode 18 extends from the gate line 8. The reflective LCD device 100 further includes reflective electrodes 10. The reflective electrode 10 is electrically connected with the drain electrode 14 through a contact hole 16 and is made of a metal having a good reflectance.

FIG. 3 is a cross sectional view taken along the line III—III of FIG. 2. As shown in FIG. 3, the gate electrode 18 is formed on the substrate 1, and a gate insulating layer 20 is formed on the exposed surface of the substrate 1 while covering the gate electrode 18. A semiconductor layer 22 as an active area of the TFT "S" (see FIG. 2) is formed over the gate electrode 18. The source and drain electrodes 12 and 14 are spaced apart from each other. The source electrode 12 overlaps one end portion of the semiconductor layer 22, and the drain electrode 14 overlaps the other end portion of the semiconductor layer 22. A passivation film 24 is formed over the whole surface of the substrate 1 while covering the TFT "S". The passivation film 24 has the contact hole 16 on the predetermined portion of the drain electrode 14. The reflective electrode 10 is formed on the passivation film 24 and is electrically connected with the drain electrode 14 through the contact hole 16.

As mentioned above, since the reflective LCD device uses ambient light, a battery is not necessary. By the way, the reflective LCD device has a problem in that it is affected by its surroundings. For example, the brightness of indoors-ambient light differs largely from that of outdoors. Also, even in the same location, the brightness of ambient light depends on the time of day (e.g., noon or dusk). Therefore, the reflective LCD device cannot be used at night without ambient light.

For the foregoing reasons, there is a need for a transflective LCD device that can be used during the day as well as at night.

FIG. 4 is a plan view illustrating an array substrate of a transflective liquid crystal display (LCD) device according to a conventional art. As shown in FIG. 4, the array substrate includes a gate line 50 arranged in a transverse direction, data line 60 arranged in a longitudinal direction perpendicular to the gate line 50, and a thin film transistor (TFT) arranged near the cross portion of the gate and data lines 50 and 60. The TFT has a gate electrode 52, a source electrode 62 and a drain electrode 64. The gate electrode 52 extends from the gate line 50, and the source electrode 62 extends from the data line 60. The drain electrode 64 is spaced apart from the source electrode 62. And the source electrode 62 overlaps one end portion of the gate electrode 52, and the drain electrode 64 overlaps the other end portion of the gate electrode 52. The array substrate further includes a reflective electrode 68 and a pixel electrode 70, which are formed on a region defined by the gate and data lines 50 and 60. The reflective electrode 68 and the pixel electrode 70 are electrically connected with the drain electrode 64 through contact hole 69 and 66 (see FIG. 5C). The reflective electrode 68 is made of an opaque conductive metal, and the pixel electrode 70 is made of a transparent conductive material. The reflective electrode 68 has a light transmitting hole 72 formed on a central portion thereof. The light transmitting hole 72 serves to transmit light and has a substantially rectangular shape. The pixel electrode 70 has a sufficient size to cover the light transmitting hole 72. In other words, the pixel electrode 70 covers the light transmitting hole 72.

FIGS. 5A to 5D are cross sectional views taken along the line V—V of FIG. 4, illustrating a process of manufacturing the array substrate of the transflective LCD device according to the conventional art.

First, as shown in FIG. 5A, a first metal layer is deposited on a substrate 1 and patterned into the gate electrode 52. The first metal layer is made of a metal having a high corrosion resistance such as Chrome or Tungsten or having a low resistance such as Aluminum alloy.

Then, as shown in FIG. 5B, a gate insulating layer 80, a semiconductor layer 82 and the source and drain electrodes 62 and 64 are sequentially formed. The gate insulating layer 80 is formed on the exposed surface of the substrate 1 while covering the gate electrode 52. The semiconductor layer 82 is formed on the gate insulating layer 80 and over the gate electrode 52. The source electrode 62 overlaps one end portion of the semiconductor layer 82, and the drain electrode 64 overlaps the other end portion of the semiconductor layer 82. The source and drain electrodes 62 and 64 are spaced apart from each other.

Sequentially, as shown in FIG. 5C, a passivation film 84 is formed on the exposed surface of the gate insulating layer 80 while covering the source and drain electrodes 62 and 64. A portion of the passivation film 84 on the drain electrode 54 is etched to form a first contact hole 66. The passivation film 84 is made of an insulating material having a good moisture resistance and a good transmittance and preferably Silicon Nitride ($SiN_x$) or Silicon Oxide ($SiO_x$). Next, the pixel electrode 70 is formed on the passivation film 84 and is electrically connected with the drain electrode 64 through the first contact hole 66. The pixel electrode 70 is made of a transparent conductive metal having a good transmittance and preferably one of Indium Tin Oxide (ITO) and Indium Zinc Oxide (IZO).

After that, as shown in FIG. 5D, an inter-layer insulating film 86 is formed over the entire surface of the substrate 1 while covering the pixel electrode 70. The interlayer insulating film 86 is made of made of one of Benzocyclobutene (BCB) that has a good transmittance. A portion of the inter-layer insulating film 86 over the first contact hole 66 is etched to form a second contact hole 69. Then, the reflective electrode 68 is formed on the inter-layer insulating film 86 and is electrically connected with the pixel electrode 70. A portion of the reflective electrode 68 is etched to form the light transmitting hole 72.

FIG. 6 is a schematic cross-sectional view illustrating the operating principle of the transflective LCD device according to the conventional art. As shown in FIG. 6, the transflective LCD device includes a liquid crystal panel and a backlight device 102. The liquid crystal display panel includes lower and upper substrates 108 and 106 with an interposed liquid crystal layer 100. The upper substrate 106 has a color filter 104, and the lower substrate 108 as the array substrate has the TFT, the pixel electrode 70 and the reflective electrode 68. The reflective electrode 68 includes the light transmitting hole 72 formed therein. The inter-layer insulating film 86 is interposed between the reflective electrode 68 and the pixel electrode 70. The pixel electrode 70 covers a region corresponding to the light transmitting hole 72. The transflective LCD device further includes an upper polarizer (not shown) on the upper substrate 106 and a lower polarizer (not shown) located between the lower substrate 108 and the backlight device 102.

The transflective LCD device according to the conventional art is operated as follows.

First, in the reflective mode, the incident light 110 from the outside is reflected on the reflective electrode 68 and directs toward the upper substrate 106 again. At this time, when the electrical signals are applied to the reflective electrode 68 by the switching element (not shown), phase of the liquid crystal layer 100 varies and thus the reflected light of the incident light 110 is colored by the color filter 104 and displayed in the form of colored light. In the transmissive mode, light 112 emitted from the backlight device 102 passes through the transmitting holes 72. At this time, when the electrical signals are applied to the pixel electrode 70 by the switching element (not shown), phase of the liquid crystal layer 100 varies. Thus, the light 112 passing through the liquid crystal layer 100 is colored by the color filter 104 and displayed in the form of images with other colored lights.

FIG. 7 is an enlarged view illustrating the portion "A" of FIG. 5D, focused on the first and second contact holes. In the conventional art, as shown in FIG. 7, the passivation layer 84 is etched by using a photolithography process to form the first contact hole 66 through which the pixel electrode 70 contacts the drain electrode 64. And then the inter-layer insulating layer 86 is also etched to form the second contact hole 69 through which the reflective electrode 68 contacts the pixel electrode 70. Thus, the reflective electrode 68 is electrically connected to the drain electrode 64.

However, the above-mentioned process has some problems in that the photolithography process is performed twice to form the first and second contact holes and to electrically connect the reflective electrode to the drain electrode. Also, the photolithography process includes a lot of processes such as a cleaning process, an exposure process, a baking process, a developing process, etc.

Therefore, if one photolithography process is omitted, the manufacturing yields will increase and the defects caused by misalignment will decrease.

Meanwhile, due to the fact that the reflective electrode made of opaque metal is formed in the latest process step and that the reflective electrode reflects an alignment signal very well, the align key is not easily recognized during the photolithography process, i.e., misalignment occurs.

SUMMARY OF THE INVENTION

Accordingly, the present invention is directed to an array substrate of an LCD device that substantially obviates one or more of the problems due to limitations and disadvantages of the related art.

To overcome the problems described above, a preferred embodiment of the present invention provides a transflective LCD device manufactured by a simplified process.

Additional features and advantages of the invention will be set forth in the description that follows, and in part will be apparent from that description, or may be learned by practice of the invention. The objectives and other advantages of the invention will be realized and attained by the structure particularly pointed out in the written description and claims hereof as well as the appended drawings.

In order to achieve the above object, the preferred embodiment of the present invention provides an array substrate of transflective liquid crystal display (LCD) device, including: a substrate having switching elements and a pixel region; a reflective plate formed on the substrate and having a light transmitting hole; a first insulating layer formed on the reflective plate while covering the light transmitting hole; a gate electrode formed on the first insulating layer over the reflective plate; a gate insulating layer formed on the first insulating layer while covering the gate electrode; an active layer formed on the gate insulating layer over the gate electrode and having a channel region; an ohmic contact layer formed on the active layer; source and drain electrodes formed on the ohmic contact layer and spaced apart from each other; a second insulating layer formed on the gate insulating layer while covering the source and drain electrode, the second insulating layer having a drain contact hole which exposes the predetermined portion of the drain electrode; and a pixel electrode formed on the second insulating layer and contacting the drain electrode through the drain contact hole.

The reflective electrode is beneficially made of a opaque conductive metal and the pixel electrode is beneficially made of the material selected from a group of consisting of Indium-Tin-Oxide (ITO) and Indium-Zinc-Oxide (IZO).

It is to be understood that both the foregoing general description and the following detailed description are exemplary and explanatory and are intended to provide further explanation of the invention as claimed.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which:

As shown in FIG. 8, the array substrate includes a gate line 150 arranged in a transverse direction, a data line 160 arranged in a longitudinal direction perpendicular to the gate line 150, and a thin film transistor (TFT) arranged near the cross portion of the gate and data lines 150 and 160. The TFT has a gate electrode 152, a source electrode 162 and a drain electrode 164. The gate electrode 152 extends from the gate line 150, and the source electrode 162 extends from the data line 160. The drain electrode 164 is spaced apart from the source electrode 162. The source electrode 162 overlaps one end portion of the gate electrode 152, and the drain electrode 164 overlaps the other end portion of the gate electrode 152. The array substrate further includes a reflective plate 156 and a pixel electrode 168, which are formed on a region defined by the gate and data lines 150 and 160. The pixel electrode 168 is electrically connected with the drain electrode 164 through a contact hole 166. The reflective plate 156 is made of an opaque conductive metal, and the pixel electrode 168 is made of a transparent conductive material such as Indium-Tin-Oxide (ITO) or, Indium-Zinc-Oxide (IZO). The reflective plate 156 has a light transmitting hole 154 formed on a central portion thereof. The light transmitting hole 154 serves to transmit light and has a substantially rectangular shape. The pixel electrode 168 has a sufficient size to cover the light transmitting hole 154. In other words, the pixel electrode 168 covers the light transmitting hole 154.

DETAILED DESCRIPTION OF PREFERRED EMBODIMENTS

Reference will now be made in detail to the preferred embodiment of the present invention, example of which is illustrated in the accompanying drawings.

Figure 1:
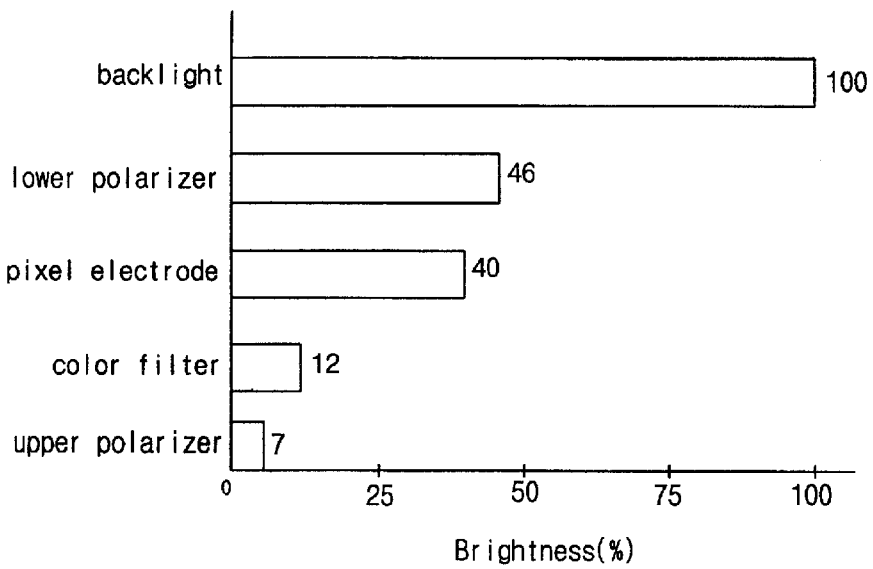
FIG. 1 is a graph illustrating a transmittance respectively measured after light passes through each layers of a conventional liquid crystal display device.
Figure 2:
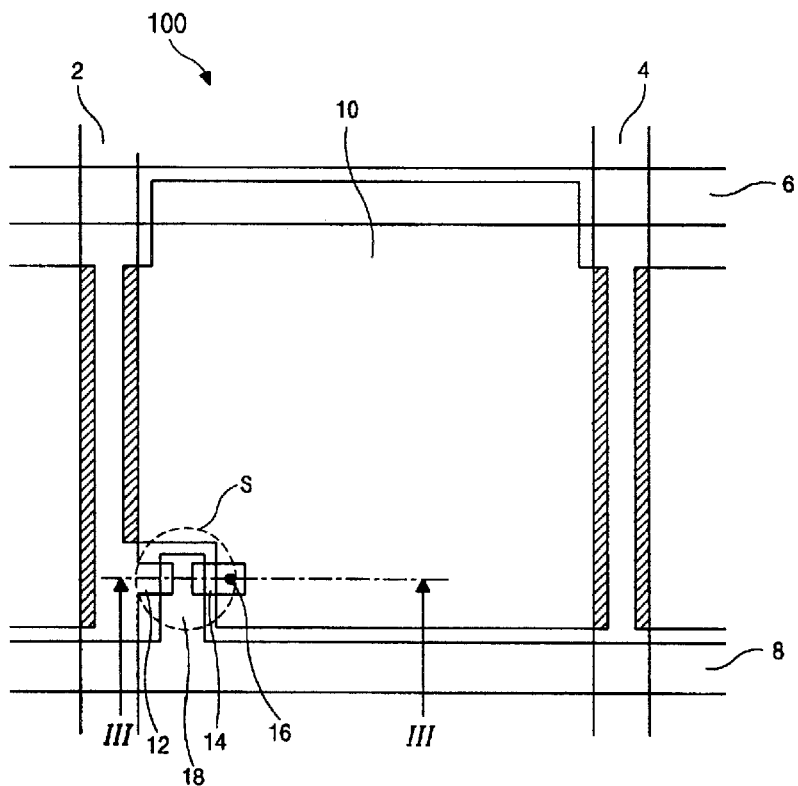
FIG. 2 is a plan view illustrating a conventional reflective liquid crystal display device.
Figure 3:
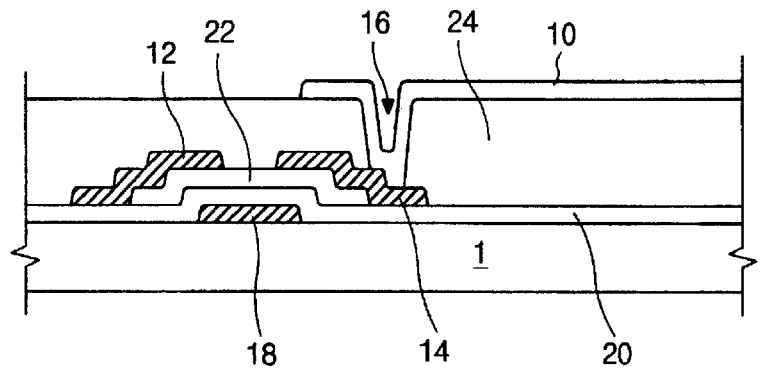
FIG. 3 is a cross sectional view taken along the line III—III of FIG. 2, illustrating the conventional reflective liquid crystal display device.
Figure 4:
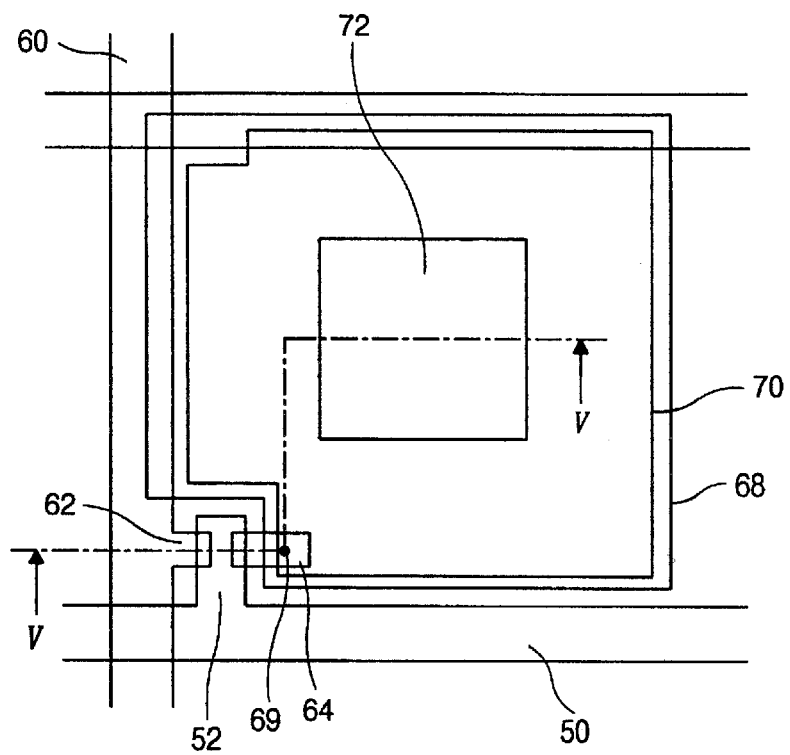
FIG. 4 is a plan view illustrating an array substrate of a transflective liquid crystal display device according to a conventional art.
Figure 5A:
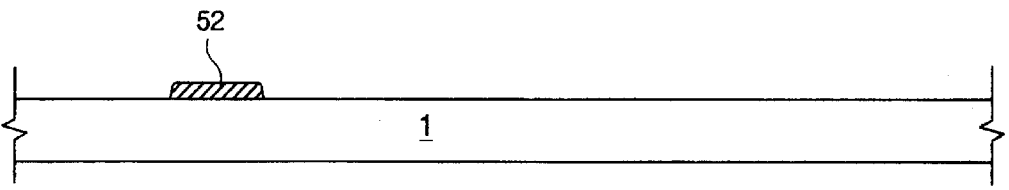
FIGS. 5A to 5D are cross sectional views taken along the line V—V of FIG. 4, illustrating a process for manufacturing the array substrate of the transflective liquid crystal display device according to the conventional art.
Figure 5B:
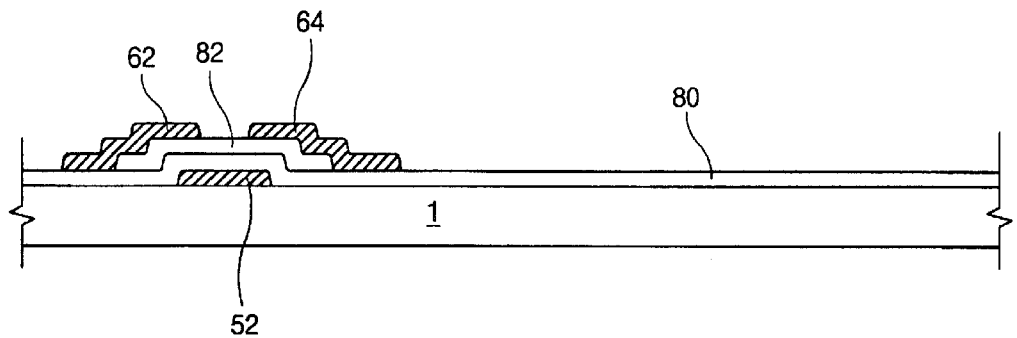
Figure 5C:
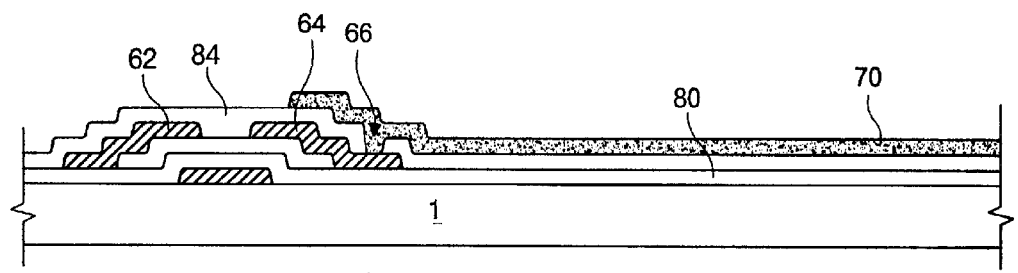
Figure 5D:
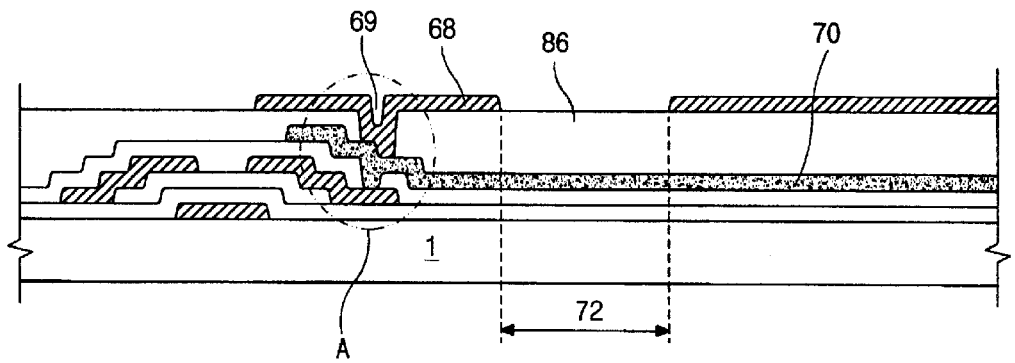
Figure 6:
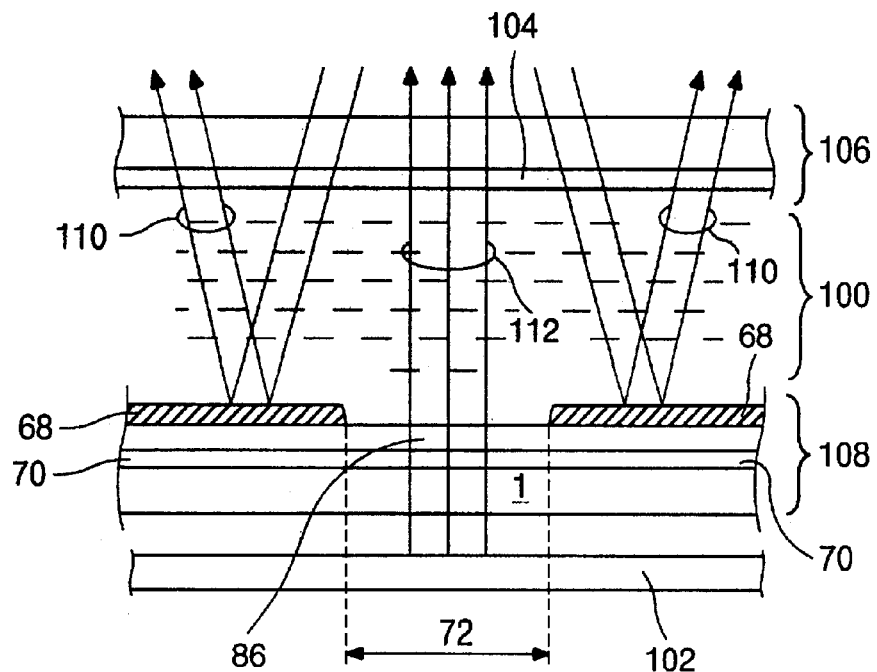
FIG. 6 is a cross sectional view illustrating a modification of the array substrate of the transflective liquid crystal display device according to the conventional art.
Figure 7:
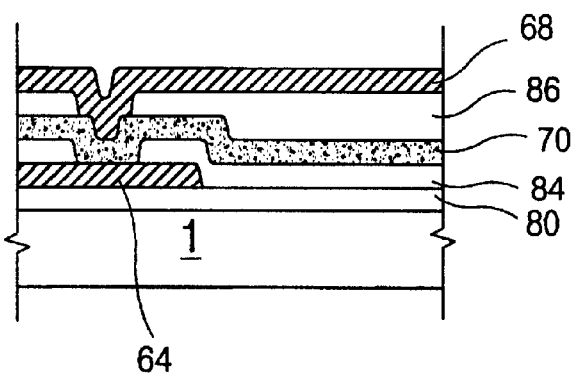
FIG. 7 is an enlarged view illustrating the portion "A" of FIG. 5D and focused on the first and second contact holes.
Figure 8:
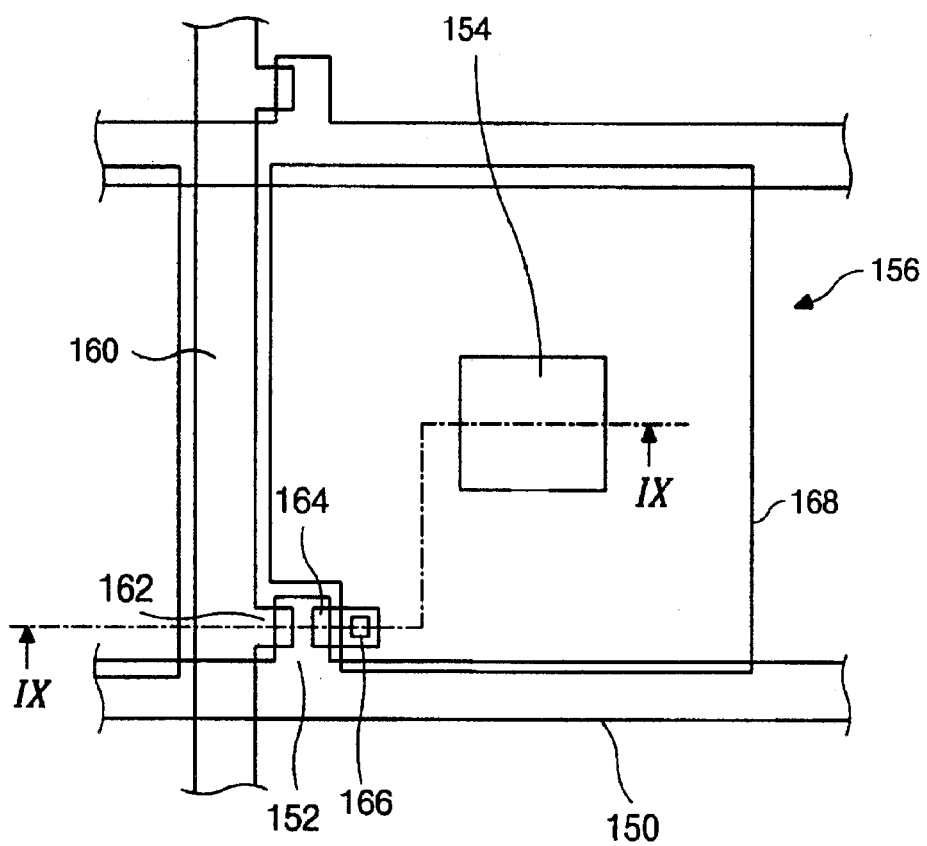
FIG. 8 is a plan view illustrating an array substrate of a transflective liquid crystal display (LCD) device according to a preferred embodiment of the present invention.

FIG. 8 is a plan view illustrating an array substrate of a transflective liquid crystal display (LCD) device according to a preferred embodiment of the present invention. As shown in FIG. 8, the array substrate includes a gate line 150 arranged in a transverse direction, a data line 160 arranged in a longitudinal direction perpendicular to the gate line 150, and a thin film transistor (TFT) arranged near the cross portion of the gate and data lines 150 and 160. The TFT has a gate electrode 152, a source electrode 162 and a drain electrode 164. The gate electrode 152 extends from the gate line 150, and the source electrode 162 extends from the data line 160. The drain electrode 164 is spaced apart from the source electrode 162. And the source electrode 162 overlaps one end portion of the gate electrode 152, and the drain electrode 164 overlaps the other end portion of the gate electrode 152. The array substrate further includes a reflective plate 156 and a pixel electrode 168, which are formed on a region defined by the gate and data lines 150 and 160. The pixel electrode 168 is electrically connected with the drain electrode 164 through a contact hole 166. The reflective plate 156 is made of an opaque conductive metal, and the pixel electrode 70 is made of a transparent conductive material such as Indium-Tin-Oxide (ITO) or Indium-Zinc-Oxide (IZO). The reflective plate 156 has a light transmitting hole 154 formed on a central portion thereof. The light transmitting hole 154 serves to transmit light and has a substantially rectangular shape. The pixel electrode 168 has a sufficient size to cover the light transmitting hole 154. In other words, the pixel electrode 168 covers the light transmitting hole 154.

FIGS. 9A to 9D are cross sectional views taken along the line IX—IX of FIG. 8, illustrating a process of manufacturing the array substrate of the transflective LCD device according to the preferred embodiment of the present invention.

Figure 9A:
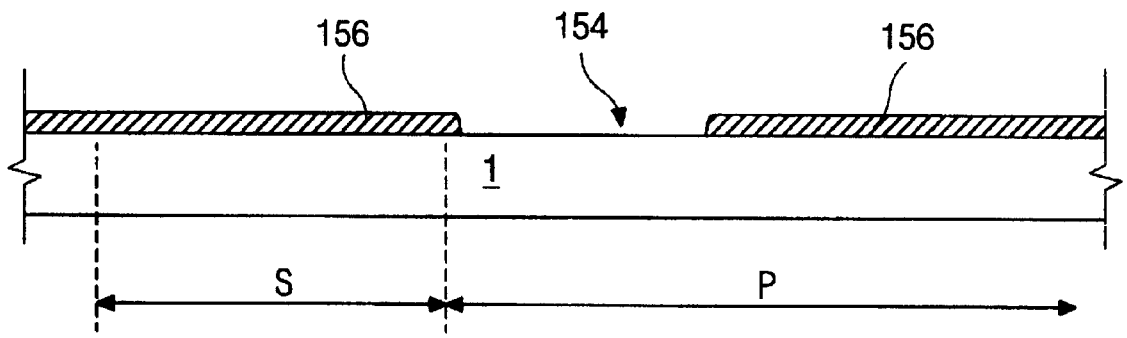
FIGS. 9A to 9D are cross sectional views taken along the line IX—IX of FIG. 4, illustrating a process for manufacturing the array substrate of the transflective liquid crystal display device according to the preferred embodiment of the present invention.

First, as shown in FIG. 9A, a substrate 1 is divided into a switching potion "S" and a pixel region "P". A first metal layer is deposited on a substrate 1 and patterned into the reflective plate 156 that has a light transmitting hole 154 in the pixel region "P". Thus, the first metal layer preferably covers the entire substrate 1 except the portion for the light transmitting hole 154. The first metal layer is preferably made of an opaque metal having the superior reflectance such as Aluminum-Neodymium (AlNd).

Figure 9B:
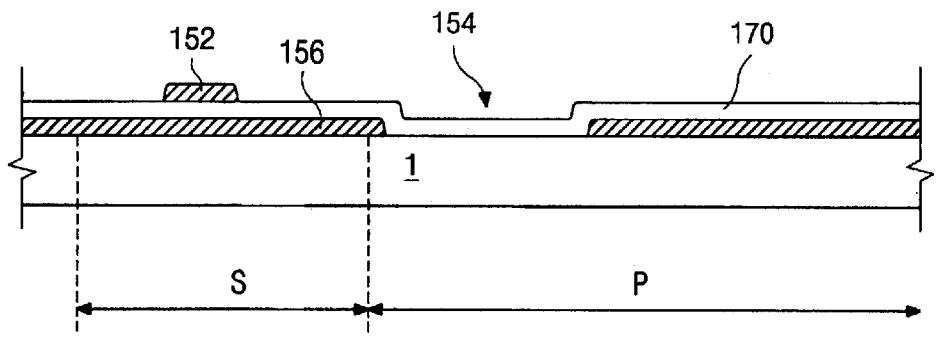

Then, as shown in FIG. 9B, a first insulating layer 170 is formed on the reflective plate 156 while covering the light transmitting hole 154. As a material for the first insulating layer 170, Silicon Nitride (SiN$_x$) or Silicon Oxide (SiO$_x$) is used. Then, a second metal layer is deposited on the first insulating layer 170 and patterned into a gate electrode 152 over the reflective plate 156 in the switching portion "S".

Figure 9C:
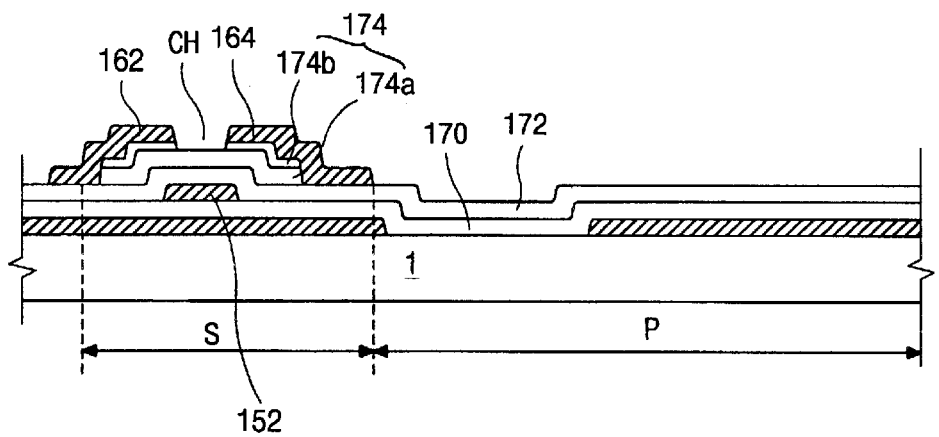

FIG. 9C is a cross-sectional view illustrating a process step of fabricating the thin film transistor (TFT) as a switching element. The TFT includes the gate electrode 152, the semiconductor layer 174 and the source and drain electrodes 162 and 164. The preferred embodiment of the present invention employs the inverted staggered type.

A gate insulating layer 172 is formed on the first insulating layer 170 while covering the gate electrode 152. Then the intrinsic semiconductor (pure amorphous silicon) and the extrinsic semiconductor (impurity amorphous silicon) are sequentially deposited on the gate insulating layer 172, and patterned into the active layer 174a and the ohmic contact layer 174b, respectively. The spaced apart source and drain electrodes 162 and 164 are formed on the ohmic contact layer 174b. The portion of the ohmic contact layer 174b, between the source electrode 162 and the drain electrode 164, is removed to form a channel region "CH" on the active layer 174a. Thus, The source electrode 162 overlaps one of the ohmic contact layer 174b, and the drain electrode 164 overlaps the other ohmic contact layer 174b. And the source and drain electrodes 162 and 164 are spaced apart from each other.

Figure 9D:
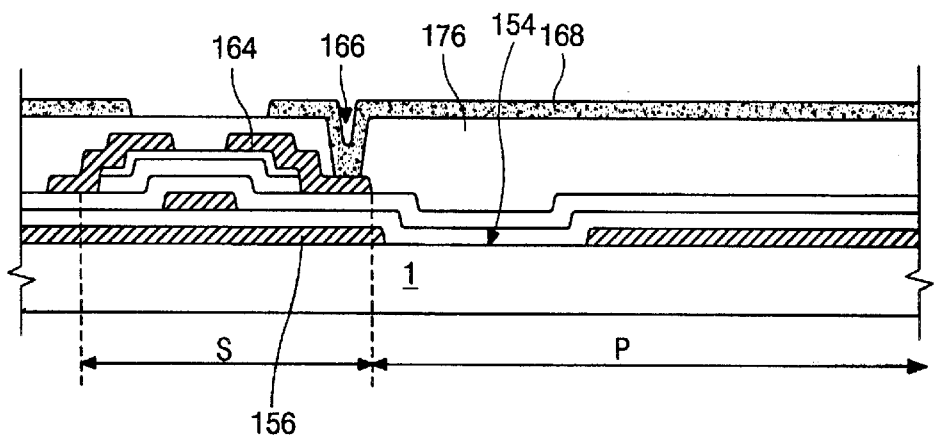

After that, as shown in FIG. 9D, a second insulating film 176 is formed over the gate insulating layer 172 while covering the TFT portion "S". A portion of the second insulating film 176 over the drain electrode 164 is etched to form a drain contact hole 166 that exposes the predetermined portion of the drain electrode 164. Then, the pixel electrode 168 is formed on the second insulating film 176 and is electrically connected with the drain electrode 164 through the drain contact hole 166. The pixel electrode 168 formed over the pixel region "P" and covers the light transmitting hole 154. The pixel electrode 168 is made of a transparent conductive metal having a good transmittance and preferably one of Indium Tin Oxide (ITO) and Indium Zinc Oxide (IZO).

As described above, since the reflective plate is formed at first and does not contact the drain electrode through another contact hole in the preferred embodiment of the present invention, the contact hole through which the reflective plate contacts the drain electrode is not required. Thus, the process of forming another contact hole can be omitted.

Moreover, since the reflective plate is formed at first on the substrate, the alignment defects, which are caused by the reflectivity of the reflective electrode in the conventional art, decrease. Meanwhile, since the reflective plate is formed on the entire surface of the substrate except the portion for the light transmitting hole, and since the reflective plate is overlapped by the gate electrodes and the gate lines, the aperture ratio increase in the reflective mode of the transflective LCD device.

Namely, the TFT array substrate of preferred embodiments has the following advantages.

First, since the pixel electrode only directly contacts the drain electrode, another process of forming the contact hole through which the reflective electrode electrically contacts the drain electrode is omitted compared to the conventional transflective LCD device.

Second, since the reflective plate is formed at first, the alignment defects caused by the reflective electrode can decrease.

Third, since the reflective plate is formed on the entire surface of the substrate except the light transmitting hole, the aperture ratio increases in the reflective mode of the transflective LCD device.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. An array substrate of a transflective liquid crystal display (LCD) device comprising:
    a substrate having switching elements and a pixel region;
    a reflective plate formed on the substrate and extending to the pixel region, the reflective plate having a light transmitting hole;
    a first insulating layer formed on the reflective plate while covering the light transmitting hole;
    a gate electrode formed on the first insulating layer over the reflective plate;
    a gate insulating layer formed on the first insulating layer while covering the gate electrode;
    an active layer formed on the gate insulating layer over the gate electrode and having a channel region;
    an ohmic contact layer formed on the active layer;
    source and drain electrodes formed on the ohmic contact layer and spaced apart from each other;
    a second insulating layer formed on the gate insulating layer while covering the source and drain electrodes, the second insulating layer having a drain contact hole which exposes a predetermined portion of the drain electrode; and
    a pixel electrode formed on the second insulating layer and contacting the drain electrode through the drain contact hole.

2. The array substrate of claim 1, wherein the reflective plate is made of an opaque conductive metal.

3. The array substrate of claim 1, wherein the pixel electrode is made of a material selected from the group consisting of Indium-Tin-Oxide (ITO) and Indium-Zinc-Oxide (IZO).

4. The array substrate of claim 1, wherein the active layer is pure amorphous silicon.

5. The array substrate of claim 1, wherein the ohmic contact layer is impurity amorphous silicon.

6. The array substrate of claim 1, wherein the reflective plate comprises aluminum-neodymium (AlNd).

7. The array substrate of claim 1, wherein the light transmitting hole has a substantially rectangular shape.

8. The array substrate of claim 1, wherein the reflective plate does not contact the drain electrode through another contact hole.

9. The array substrate of claim 1, wherein the reflective plate is overlapped by the gate electrode, and an aperture ratio increases in a reflective mode.

10. The array substrate of claim 1, wherein the pixel electrode only directly contacts the drain electrode.

11. A method of forming a method of forming an array substrate for use in a liquid crystal display device, comprising:
    providing a substrate having switching elements and a pixel region;
    forming a reflective plate formed on the substrate, the reflective plate extending to the pixel region and having a light transmitting hole;

forming a first insulating layer on the reflective plate, the first insulating layer covering the light transmitting hole;

forming a gate electrode on the first insulating layer over the reflective plate;

forming a gate insulating layer on the first insulating layer while covering the gate electrode;

forming an active layer on the gate insulating layer over the gate electrode;

forming an ohmic contact layer on the active layer;

forming source and drain electrodes on the ohmic contact layer, the source and drain electrodes spaced apart from each other;

patterning a portion of the ohmic contact layer between the source and drain electrodes to form a channel region;

forming a second insulating layer on the gate insulating layer to cover the source and drain electrodes, the second insulating layer having a drain contact hole which exposes a predetermined portion of the drain electrode; and forming a pixel electrode on the second insulating layer, the pixel electrode contacting the drain electrode through the drain contact hole.

12. The method of claim 11, wherein the reflective plate is formed of an opaque conductive material.

13. The method of claim 11, wherein the pixel electrode is formed of a material selected from the group consisting of Indium-Tin-Oxide (ITO) and Indium-Zinc-Oxide (IZO).

14. The method of claim 11, wherein the transmitting hole is located in the pixel region.

15. The method of claim 11, wherein the pixel electrode is formed in the pixel region and covers the transmitting hole.

16. The method of claim 11, wherein the active layer is pure amorphous silicon.

17. The method of claim 11, wherein the ohmic contact layer is impurity amorphous silicon.

18. The method of claim 11, wherein the reflective plate comprises aluminum-neodymium (AlNd).

19. The method of claim 11, wherein the light transmitting hole has a substantially rectangular shape.

20. The method of claim 11, wherein the reflective plate does not contact the drain electrode through another contact hole.

21. The method of claim 11, wherein the reflective plate is overlapped by the gate electrode, and an aperture ratio increases in a reflective mode.

22. The method of claim 11, wherein the pixel electrode only directly contacts the drain electrode.

* * * * *